June 17, 1958
D. M. WRIGHT
2,839,160
LUBRICATOR FOR SEALED FRICTIONLESS BEARINGS
Filed June 14, 1956
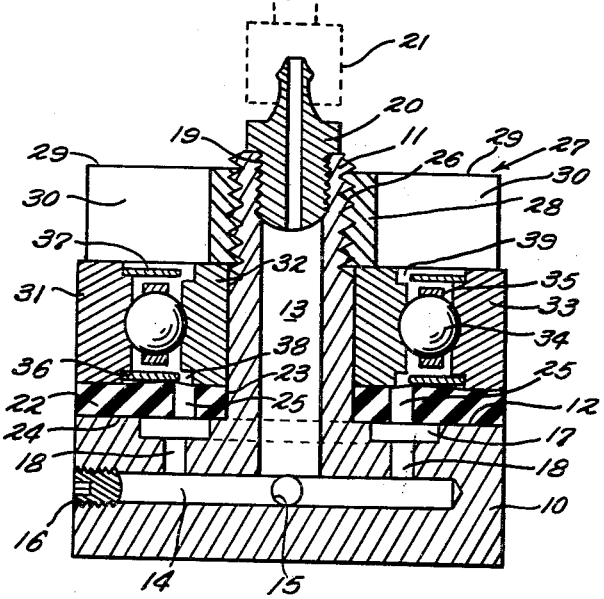
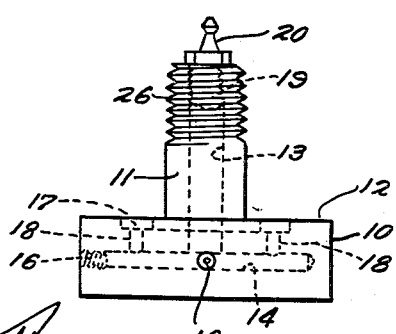
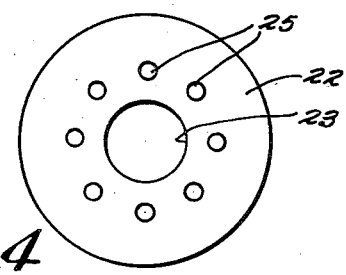
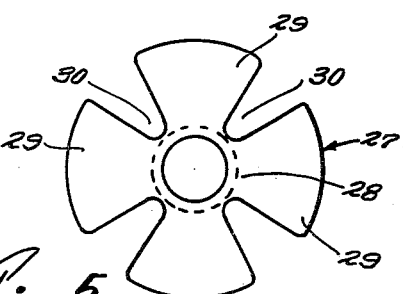
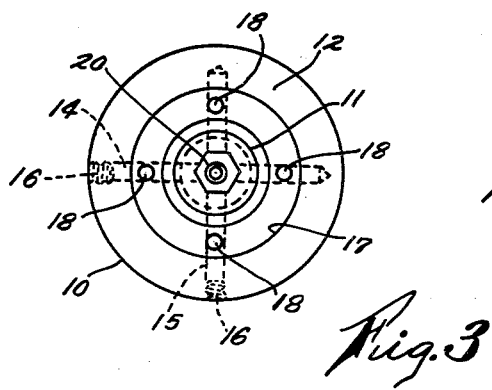
INVENTOR.
Daniel M. Wright
BY
Murray, Sackhoff & Murray
ATT'YS

2,839,160
LUBRICATOR FOR SEALED FRICTIONLESS BEARINGS

Daniel M. Wright, Cincinnati, Ohio

Application June 14, 1956, Serial No. 591,482

5 Claims. (Cl. 184—1)

The present invention relates to improvements in lubricators for sealed or shielded, frictionless bearings and has for its particular object the provision of a novel lubricator which is economical of lubricant because it insures that just the proper amount of lubricant will be forced into the bearing and a minimum of usable grease will be wasted by adherence to the exterior of the bearing after the regreasing operation thereon.

Another object of the invention is to provide an inexpensive tool for lubricating sealed, frictionless bearings which is adapted for use as an accessory in repair and service kits for many types of machines.

A further object of the invention is to provide a pressure lubricator adaptor that insures a grease tight, positive connection with each frictionless bearing regreased thereby and which has cooperable parts permitting accommodation of the lubricator to various sizes and types of frictionless bearings.

With these and other objects in view, the invention consists in the combination and arrangement of parts as will be hereinafter more fully described in detail; illustrated in the accompanying drawing, which discloses a preferred embodiment of the invention; and pointed out in the claims hereunto appended.

In the accompanying drawing:

Fig. 1 is an enlarged section taken vertically through the center of my lubricator, a sealed ball bearing to be regreased being also shown therein in central section.

Fig. 2 is a side elevational view of the base member for my lubricator.

Fig. 3 is a top plan view of said base member.

Fig. 4 is a plan view of the resilient adaptor disc for my lubricator, and

Fig. 5 is a top plan view of the draw up nut for the lubricator.

Referring more specifically to the drawings wherein the same reference numerals indicate like parts throughout the several views my lubricator for sealed or shielded frictionless bearings comprises an annular base member 10 having a relatively thick body of non-corroding metal and an integral, centrally disposed post 11 extending from, and normal to, a planar major face 12 of said base member. The post is axially bored at 13, said bore projecting into the center of the member 10 to there communicate with the central portions of a number of intersecting bores 14 and 15 formed diagonally through the annular body of said member. The bores are formed by drilling through the annular surface of the member nearly to the opposite portion thereof and then threading the entrant end thereof and inserting a cooperating threaded plug 16 therein. A circular, relatively wide or radially extensive lubricant distributing recess 17 is formed in the major face 12 of the body member 10 concentric with, and radially spaced outwardly from the post 11, the recess being in open communication with the intersecting bores 14 and 15 and by short bores 18—18 formed in the body member through the bottom of the recess and into the tops of the intersecting bores. The interior surface of the mouth of the bore 13 is threaded at 19 to mount a fitting 20 which cooperates with the separable nozzle 21 of a conventional pressure type grease gun (not shown). Thus lubricant under pressure is forced from the gun nozzle 21 into the distributing recess 17 through the bore 13, the intersecting bores 14-15 and the short bores 18—18.

A ring-shaped adaptor disc 22 is provided with a central opening 23 that snugly receives the post 11, said disc being constructed from a resilient, grease resistant synthetic plastic material and having one of its surfaces 24 in face-to-face contact with the major face 12 of the body member. A circular row of angularly spaced apart lubricant discharge openings 25 is formed through the disc, said row being concentric with the post and in registry with the recess 17 in the body member 10. The upper end of the post has external threads 26 formed therearound for cooperation with a hand nut 27 that has a reduced hub 28 and a number of angularly spaced apart, radially extending arms 29 which form relatively deep radial interstices 30 in the nut between adjacent arms.

My lubricator is illustrated in Fig. 1 in operative position with respect to the usual sealed ball bearing 31 having an inner bearing race 32 and an outer bearing race 33, the balls 34 being mounted in a cage 35, and the sealing rings 36 and 37 pressed into side flanges extending from the outer race 33. A small annular space 38 and 39 is formed between the inner race 32 and the inner annular edges of the sealing rings 36 and 37, respectively, to provide for relative rotation between the said race and the ring. As shown in Fig. 1 the opening in the inner race 32 of the anti-friction bearing 31 is slidably received on the post to center it with respect to the circular row of lubricant discharge holes 25 and in position such that the annular space 38 between the sealing ring 36 and the inner bearing race 32 is in registry with all the lubricant discharge mouths of the openings 25 in the row. When different sized bearings are to be regreased with my lubricator an adaptor disc 22 having a row of holes 25 therein corresponding to and registering with the particular annular opening between the ring and sealing race is placed in position upon the major face 12 of the body member, it being noted that the recess 17 is of sufficient radial extent to register with a relatively large number of discs having rows of discharge openings formed therein each on different radii.

The hold down nut 27 is manually drawn up on the post 11 to engage the upper sides of both bearing races and to force the bottom sides of the bearing races into the body of the resilient disc 22 to thereby make fluid tight connections between the mouths of all the discharge ports 25 and the annular opening 38 in the bearing so that all the new grease or lubricant will be forced into the bearing through the said annular space and not a particle of said grease will remain on the exterior surfaces of the bearing. When new grease or lubricant is forced into the bearing it displaces any used grease, or other foreign matter therein and all such old grease and matter will be forced out through the annular space 39 between the sealing ring 37 and the inner race 32 of the bearing, it being noted that the radial interstices 30 in the nut are deep enough to permit the operator to see when all the old grease has been discharged from the bearing through the space 39 signalling termination of the regreasing operation on the particular bearing.

What is claimed is:

1. A lubricating device for sealed frictionless bearings comprising a base member having a planar major surface, a post fixed to the central portion of the member and projecting from said surface at right angles thereto, an annular recess formed in the surface of the member concentric with the post, a resilient, ring-shaped disc surrounding the post and in face-to-face contact with said major surface, said disc having a circular row of spaced openings formed therethrough in registry with the recess, all of said holes being positioned for communication with the annular open space between the shield and a race of the bearing, a bearing hold down means cooperative with the upper surfaces of both bearing races and the top of the post and adapted to press the bottom sides of the bearing races against the resilient disc, and means in the base member for introducing lubricant under pressure into the recess.

2. A lubricating device for sealed frictionless bearings as set forth in claim 1 characterized by the fact that the top of the post is externally threaded and the hold down means is a nut threaded to the post.

3. A lubricating device for sealed frictionless bearings as set forth in claim 2 further characterized by the fact that the nut bears equally against the inner and outer races of the bearing and has a series of radially extending interstices formed therethrough exposing portions of the annular open space located between the shield and the inner race on the opposed side of the bearing.

4. A lubricating device for sealed frictionless bearings comprising a flat base member having a planar major surface, a post fixed to the central portion of the member and projecting therefrom at right angles to the planar major surface, an annular lubricant distributing recess formed in the major surface of the member concentric with the post, a resilient ring-shaped disc surrounding the post and in face-to-face contact with said major surface, said disc having a circular row of angularly spaced apart lubricant discharge openings formed therethrough in registry with the recess in the member, all of said holes being positioned for communication with the annular open space between the shield and a race on one side of the bearing, a bearing hold down means cooperative with the top of the post and adapted to contact the opposed side of each of the bearing races and press said one side of the bearing against the resilient disc, a lubricant fitting mounted upon the end of the post adapted for cooperative engagement with a lubricant pressure device, and passageways within the post and the member establishing open communication from the fitting to the recess for the passage of lubricant under pressure therebetween.

5. A lubricating device for sealed frictionless bearings as set forth in claim 4 characterized by the fact that the lubricant distributing recess in the major surface of the base member has a relatively wide dimension, and that the resilient disc is axially slidable on the post and that the lubricant discharge holes in said disc have smaller diameters than the width dimension of the recess in the base member.

References Cited in the file of this patent

UNITED STATES PATENTS

| | | |
|---|---|---|
| 2,210,478 | Berg | Aug. 6, 1940 |

FOREIGN PATENTS

| | | |
|---|---|---|
| 597,766 | Great Britain | Feb. 3, 1948 |